United States Patent
Rodgers et al.

(10) Patent No.: US 9,798,525 B2
(45) Date of Patent: Oct. 24, 2017

(54) METHOD AND SYSTEM FOR IMPLEMENTING AN ACTION COMMAND ENGINE

(71) Applicant: Oracle International Corporation, Redwood Shores, CA (US)

(72) Inventors: Michael Patrick Rodgers, Orange, CA (US); Gurbinder Singh Bali, Highlands Ranch, CO (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 482 days.

(21) Appl. No.: 14/491,914

(22) Filed: Sep. 19, 2014

(65) Prior Publication Data
US 2015/0089466 A1 Mar. 26, 2015

Related U.S. Application Data

(60) Provisional application No. 61/880,809, filed on Sep. 20, 2013.

(51) Int. Cl.
G06F 9/44 (2006.01)
G06Q 10/06 (2012.01)
G06Q 30/00 (2012.01)

(52) U.S. Cl.
CPC ............ *G06F 8/34* (2013.01); *G06Q 10/06* (2013.01); *G06Q 30/01* (2013.01)

(58) Field of Classification Search
CPC ...................................................... G06F 9/44
USPC ................................................. 717/101–105
See application file for complete search history.

(56) References Cited

U.S. PATENT DOCUMENTS

| | | | | |
|---|---|---|---|---|
| 5,448,739 A * | 9/1995 | Jacobson | ............ | G06F 9/45512 345/440 |
| 5,805,167 A * | 9/1998 | van Cruyningen | ... | G06F 3/0482 715/808 |
| 5,848,393 A * | 12/1998 | Goodridge | ......... | G06Q 10/0633 703/6 |
| 6,484,136 B1 * | 11/2002 | Kanevsky | ........... | G06F 17/2765 704/255 |
| 8,984,447 B2 | 3/2015 | Rodgers et al. | | |
| 9,372,844 B2 | 6/2016 | Rodgers et al. | | |
| 9,448,633 B2 | 9/2016 | Rodgers | | |
| 9,501,150 B2 | 11/2016 | Rodgers | | |
| 9,588,742 B2 | 3/2017 | Shakespeare et al. | | |
| 2002/0105542 A1 * | 8/2002 | Rosar | .................... | G06F 17/243 715/741 |
| 2002/0154153 A1 * | 10/2002 | Messinger | ............ | G06F 9/4446 715/705 |
| 2004/0042671 A1 * | 3/2004 | Westphal | .................. | G06T 9/00 382/232 |
| 2007/0239798 A1 * | 10/2007 | Shringi | ............. | G06F 17/30371 |

(Continued)

*Primary Examiner* — Jae Jeon
(74) *Attorney, Agent, or Firm* — Vista IP Law Group, LLP

(57) ABSTRACT

Disclosed are improved methods, systems, and computer program products for implementing an action command engine to simplify an end user's experience in executing processes in applications by enabling an action command engine to guide a user through the process in a step by step fashion. Embodiments of the invention can be implemented in different modes of operations, such as manual mode, auto-entry mode, or batch fill mode. A universal next button may be deployed to guide end user's through any process or task in software applications.

36 Claims, 10 Drawing Sheets

(56) References Cited

U.S. PATENT DOCUMENTS

| | | |
|---|---|---|
| 2011/0208540 A1* | 8/2011 | Lord ............... G06F 19/325 |
| | | 705/2 |
| 2012/0117569 A1* | 5/2012 | Fogel ............. G06Q 10/0633 |
| | | 718/102 |
| 2012/0233562 A1 | 9/2012 | Rodgers |
| 2013/0083037 A1 | 4/2013 | Rodgers |
| 2013/0086479 A1 | 4/2013 | Brown et al. |
| 2013/0086491 A1 | 4/2013 | Rodgers et al. |
| 2013/0086516 A1 | 4/2013 | Rodgers |
| 2013/0174047 A1* | 7/2013 | Sivakumar ......... G06F 9/4443 |
| | | 715/746 |
| 2014/0096046 A1 | 4/2014 | Zhong et al. |
| 2014/0304811 A1 | 10/2014 | Rodgers et al. |
| 2015/0089270 A1 | 3/2015 | Jeong et al. |
| 2015/0089304 A1 | 3/2015 | Jeong et al. |
| 2015/0089470 A1 | 3/2015 | Shakespeare et al. |
| 2016/0089606 A1 | 3/2016 | Javed et al. |
| 2016/0092036 A1 | 3/2016 | Rodgers et al. |
| 2016/0094421 A1 | 3/2016 | Bali et al. |
| 2016/0094497 A1 | 3/2016 | Javed et al. |
| 2016/0299933 A1 | 10/2016 | Fillipi et al. |

* cited by examiner

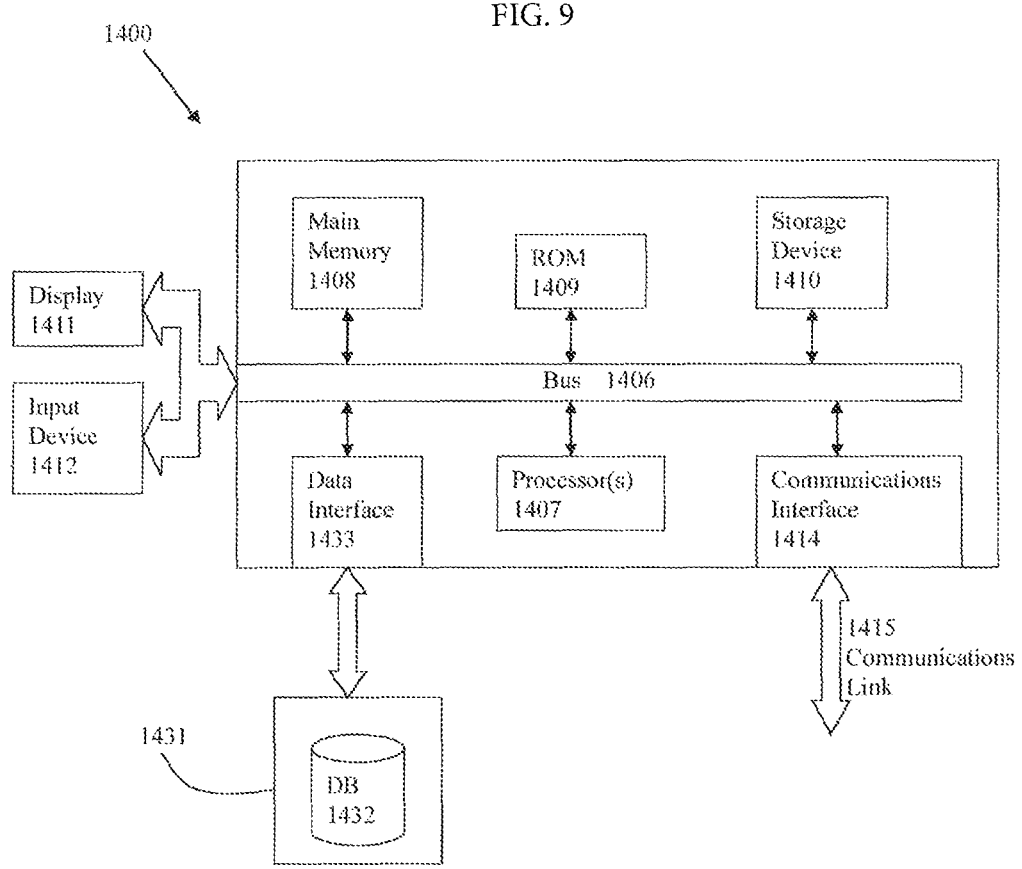

METHOD AND SYSTEM FOR IMPLEMENTING AN ACTION COMMAND ENGINE

CROSS REFERENCE TO RELATED APPLICATIONS

This application claims the benefit of priority to U.S. Provisional Application Ser. No. 61/880,809, filed Sep. 20, 2013, which is incorporated herein by reference in its entirety.

BACKGROUND

The present application relates to software development and more specifically to systems, methods, and patterns for implementing enterprise software applications.

Many types of business logic are implemented by enterprise software applications. For example, CRM (Customer Relationship Management) applications often implement business logic to perform price quotations and order capture for customers. Enterprise resource planning (ERP) systems are another example type of enterprise application, which are used to integrate management information from the multiple different portions of an organization.

Enterprise applications such as ERP and CRM software systems are very powerful, complex, and feature rich products. Given their complexity, even the most ordinary of tasks may require the user to possess a significant amount of knowledge or experience about the product. Moreover, the user manuals for these products also tend to be quite large and cumbersome, making it even more difficult for the user to understand how to operate the system.

In addition, the handling of any process to be performed in a typical enterprise application can itself be a very complex undertaking. The process may involve navigation though multiple different screens and/or interface forms. Each of these screens may require multiple interface items to be clicked, filled in, and/or selected. If the user does not process these screens and/or interface items in the correct order, with the correct information, or even picking the correct screen in the first place, then this could result in errors or failures for the process.

As is evident, enterprise applications are powerful tools that allow an enterprise to accomplish an extensive variety of functions, but this power also makes such tools very complicated to use. As a result, many ordinary users tend to have great difficulty in navigating though the various options and features to efficiently and effectively operate these applications.

Therefore, there is a need for an improved approach for implementing enterprise applications which addresses the complexity faced by end user of conventional enterprise applications.

SUMMARY

Some embodiments of the invention provide an improved method, system, and computer program product for implementing an action command engine that simplifies and improves an end user's experience in executing processes in an enterprise application. Embodiments of the invention can be implemented in different modes of operations, such as manual mode, auto-entry mode, or batch fill mode. A universal next button may be deployed to guide end user's through any process or task in enterprise applications.

This permits the invention to remove and/or minimize the complexity inherent in powerful enterprise applications, particularly in the area of process. This approach provides numerous advantages and benefits, including improving correctness, improving productivity, and making the experience of using the software much more enjoyable.

Further details of aspects, objects, and advantages of the invention are described below in the detailed description, drawings, and claims. Both the foregoing general description and the following detailed description are exemplary and explanatory, and are not intended to be limiting as to the scope of the invention.

DESCRIPTION OF THE DRAWINGS

FIG. 9 illustrates example system architecture.

DETAILED DESCRIPTION

Figure 1:
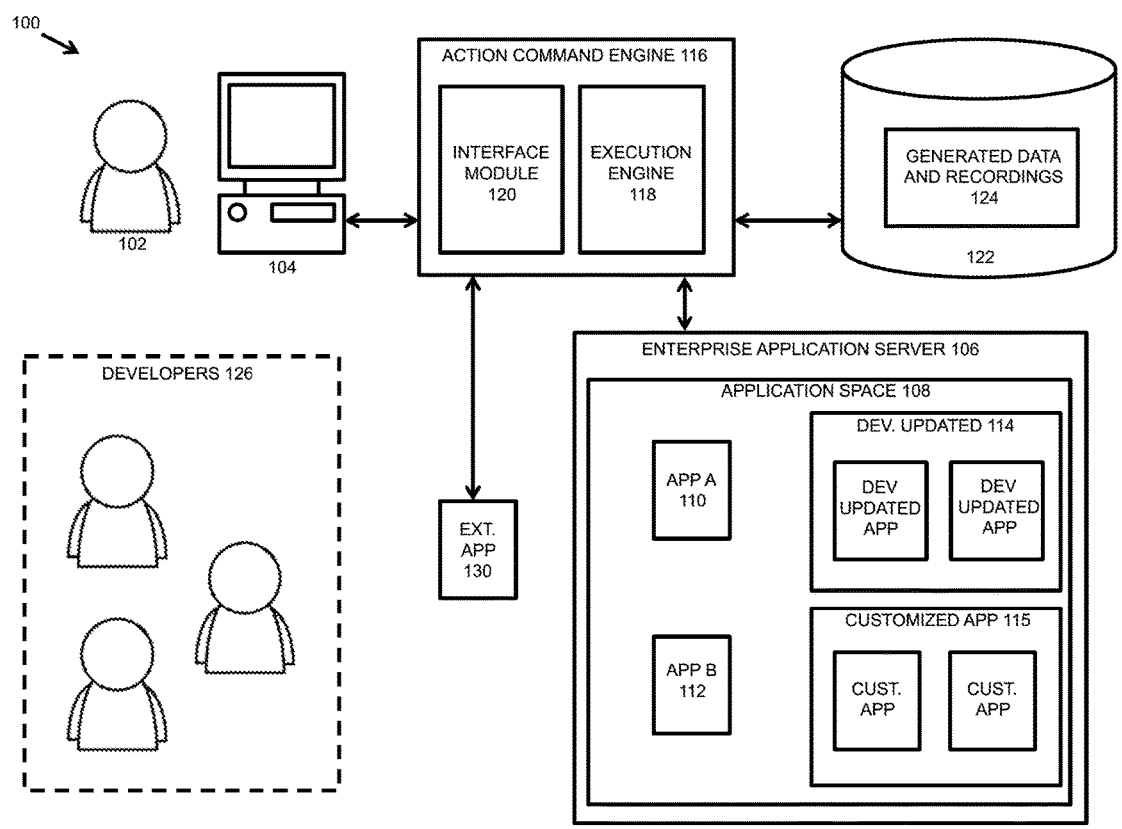
FIG. 1 illustrates an example system for implementing an action command engine.

Various embodiments are described hereinafter with reference to the figures. It should be noted that the figures are not drawn to scale and that the elements of similar structures or functions are represented by like reference numerals throughout the figures. It should be noted that the figures are only intended to facilitate the description of the embodiments. They are not intended as an exhaustive description of the invention or as a limitation on the scope of the invention. In addition, an illustrated embodiment need not have all the aspects or advantages shown. An aspect or an advantage described in conjunction with a particular embodiment is not necessarily limited to that embodiment and can be practiced in any other embodiments even if not so illustrated.

Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments. In addition, for the purposes of illustration and explanation, the present disclosure is described in various embodiments in the context of enterprise applications. It is noted, however, that the invention is not limited in its scope to enterprise applications, and indeed, may be applied to other types of applications as well.

Some embodiments of the invention provide an improved method, system, and computer program product for implementing an action command engine that simplifies and improves an end user's experience in executing processes or tasks in applications.

FIG. 1 illustrates an example system 100 to implement an action command engine 116. The system 100 includes one or more users 102 at one or more user stations 104 that may use the system 100 to operate and interact with an enterprise application server 106. The user station comprises any type of computing station that may be used to operate or interface with the enterprise application server 106 in the system 100. Examples of such user stations include, for example, workstations, personal computers, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs to the enterprise application and/or social networking application.

The enterprise application server 106 comprises any business and/or marketing related set of applications, which may collectively exist in an application space 108 that is accessible to users at the user station 104. Such enterprise/business applications can include, without limitation, customer relations management ("CRM") applications, enterprise resource planning ("ERP") applications, supply chain management applications, and other applications dealing with various finance, accounting, manufacturing, human resources, and/or distribution functions, to name but a few examples. Further, one of ordinary skill in the art will appreciate that the systems and methods disclosed herein also work with applications that are not enterprise-related, such as an external app 130, discussed in more detail below.

Different classes of applications may exist within the application space 108. For instance, two different applications are shown as App A 110, and App B 112. Also, applications that were previously published may be later updated by developers 126 and rereleased as "Dev Updated" applications 114 that have different methods and processes and may be released with updated user manuals. Further, as is common in customer specific application deployments, applications may be customized, manipulated, or otherwise rebranded with client customizations so that the resulting application is specific to a given company. Each of these applications in potential application space may require different manuals, and constant updating. However, an action command engine as described below, is able to guide users through any customized dynamic application tasks regardless if they have been updated or customized.

The action command engine 116 is used to simplify and improve the experience of the user when executing processes on applications from the enterprise application server 106. The action command engine 116 provides a framework that allows a task to be recorded as a task-specific sequence object, wherein a series of actions to complete the task may be recorded as a list of steps that enable a user to complete the task. In some embodiments, the task may require two or more applications that require different action types, for example a "print" action in a first application and a "send message" action in a second application.

The task-specific sequence object is a type of task outline that when implemented or executed shows a user how to complete the steps required to complete the task. One of ordinary skill in the art can appreciate that a task-specific sequence object can be created using several programming technologies such as process narratives, scripts, binaries and other executable file types. Task-specific sequence objects can be implemented as a new task type within the application space 108, and will be accessible anywhere that a task is normally accessible within the system. For example, they can be added to any application menus, pages, and favorites locations.

The framework will also provide an execution engine 118 that can walk the user through the task-specific sequence object using an appropriate interface generated by an interface module 120. This provides a virtualized "assistant" or "coach" that can help navigate a user through the entire process, both between and within applications in a seamless complete, end-to-end fashion.

Figure 2A:
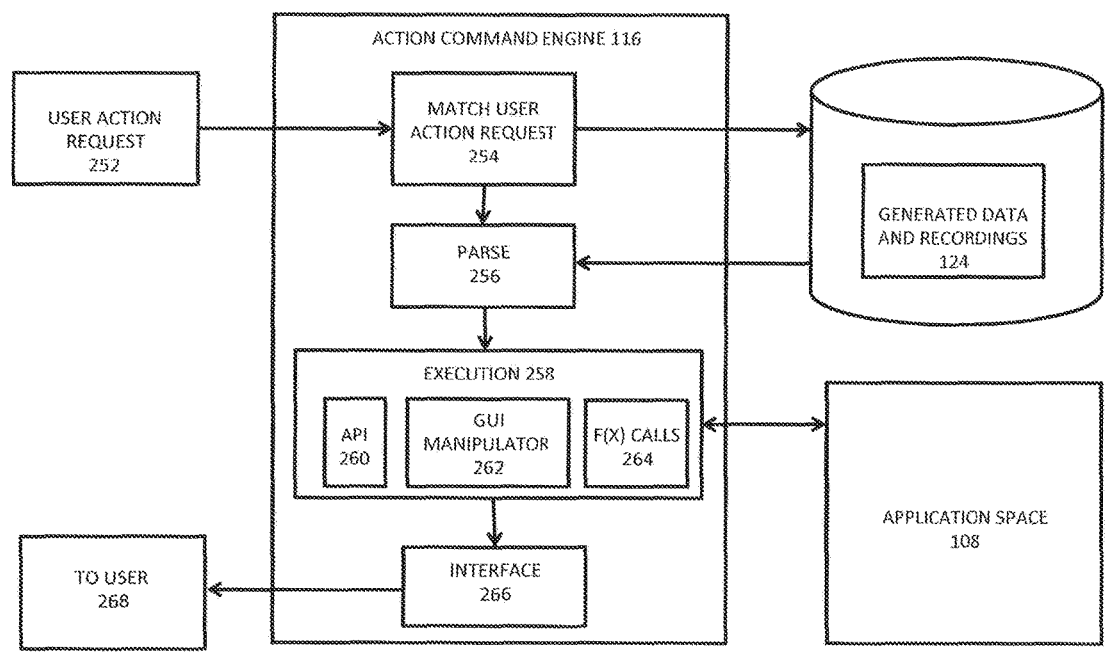
FIG. 2A-B show an example system process and screen display of an implementation of an action command engine.

FIG. 2A shows an example method of how the action command engine can coach a user through a sample task, such as "Open an application and print." At step 252, the user may request assistance from the action command engine 116 on how to perform the task using available methods, for example, by opening a side panel help window or starting the action command engine as a stand alone app and requesting assistance for a certain task. At step 254, the action command engine 116 receives the request for task assistance and determines what resources are required to help the user complete the task, such as which program must be opened or manipulated, and/or which task-specific sequence object to retrieve for the task. The action command engine then pulls the action command data from the database 122 which contains the generated data and recordings.

At step 256, the action command data is parsed and synthesized into the list of steps and data required to complete each step for the task. At step 258, the task-specific sequence object is executed to assist the user complete the task. For instance, regarding the print task example, the action command engine can open the appropriate application from application space 108 using a number of different methods, such as an API 260, GUI manipulator 262, or function calls 264. An API may be used if the programs in application space are within an enterprise or networked environment that enables APIs. If the programs are not enterprise related or otherwise do not have networked APIs, such as an external application 130 (FIG. 1), then the action command engine may use a GUI manipulator 262 to open the application and/or carry out the steps required, such as clicking a button, or highlighting a certain part of the screen. For instance, if the two applications required to carry out actions for a task are an internet browser and a word processor, both of which, in this example, run independently and were not designed to work with one another, a GUI manipulator may nonetheless assist the user by manipulating GUI elements, such as, for example, moving the mouse cursor over a given button and triggering an I/O action, such as a left mouse click. Alternatively, if the action command engine is embedded or otherwise built into specific program or programs, the engine may use function calls 264 to call functions within the program to complete the step or task. For instance, if the application is a logistics program with an integrated action command engine and the step to be completed is "print", then the action command engine may call the print function within the program to complete the task itself or further guide the user on how to complete the task.

The execution module 118 which handles executing the task-specific sequence object may further work with a interface module at step 266, which is a module that handles display or GUI elements, such as how to display the action command engine to the user, e.g. as a sidebar, an active layer, or a stand alone process. At step, 268 the interface module outputs the executed steps and display controls to the user to assist the user complete the step.

Figure 2B:
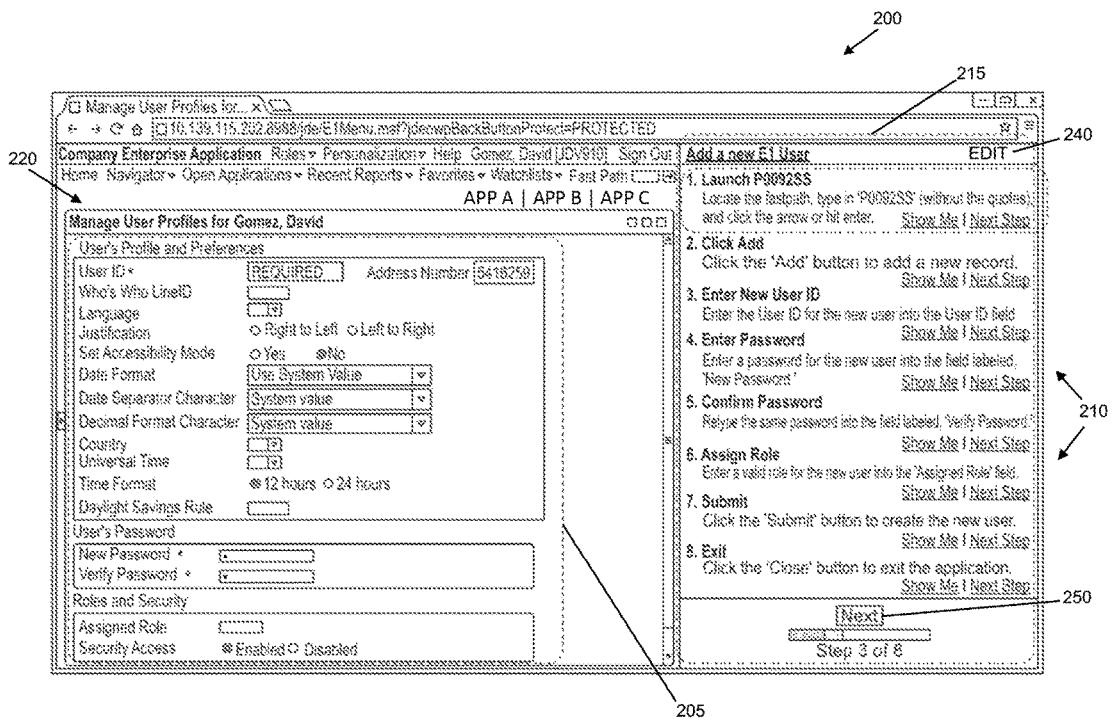

FIG. 2B is an example display view 200 of how the action command engine may be implemented in a graphical user interface. There, when a task-specific sequence object is launched, the interface generator 120 will bring up a "task director" in a task director pane 215 off to the side of a main application 220, e.g., as illustrated in FIG. 2. The task director pane may consist of a list of steps 210 in the process. The user can follow the list of steps 210 as a guide to interact with the main application 220. To the extent that it is possible, the list of steps 210 will track where the user is in the process. For example, the example task shown in FIG. 2 is entering a new user into an enterprise application, where a number of fields in a data entry area 205 must be filed out correctly to complete the process. A confused end-user, such as a novice, that would otherwise enter incorrect data can instead follow the list of steps 210 to correctly complete the task.

Examples of steps that can be placed into a task-specific sequence object include: interacting with a top-level UI component; such as navigator, carousel, etc.; interacting with a component on a form; interacting with an element on a page; external or non-enterprise application steps (for example, a purely textual step, possibly containing links, that tells the user to do something). The on screen step elements may include some or all of the following, step title, step details, on-screen elements (one or more elements on the screen to be highlighted for the user), "do-it-for-me details" for simple steps which are autocompleted for the user.

The systems and methods disclosed herein collectively allow the creation of a "universal next button" button 250 that queues the next step for the user regardless of step complexity. On input-requiring steps, it may give keyboard focus and visual identification to the relevant field. This eliminates the need for mouse movement without memorization of complex key-stroke patterns normally associated with keyboard-only navigation. On complex steps the universal next button prompts for more information and guides the user through a complex process in a thorough manner.

Figure 3:
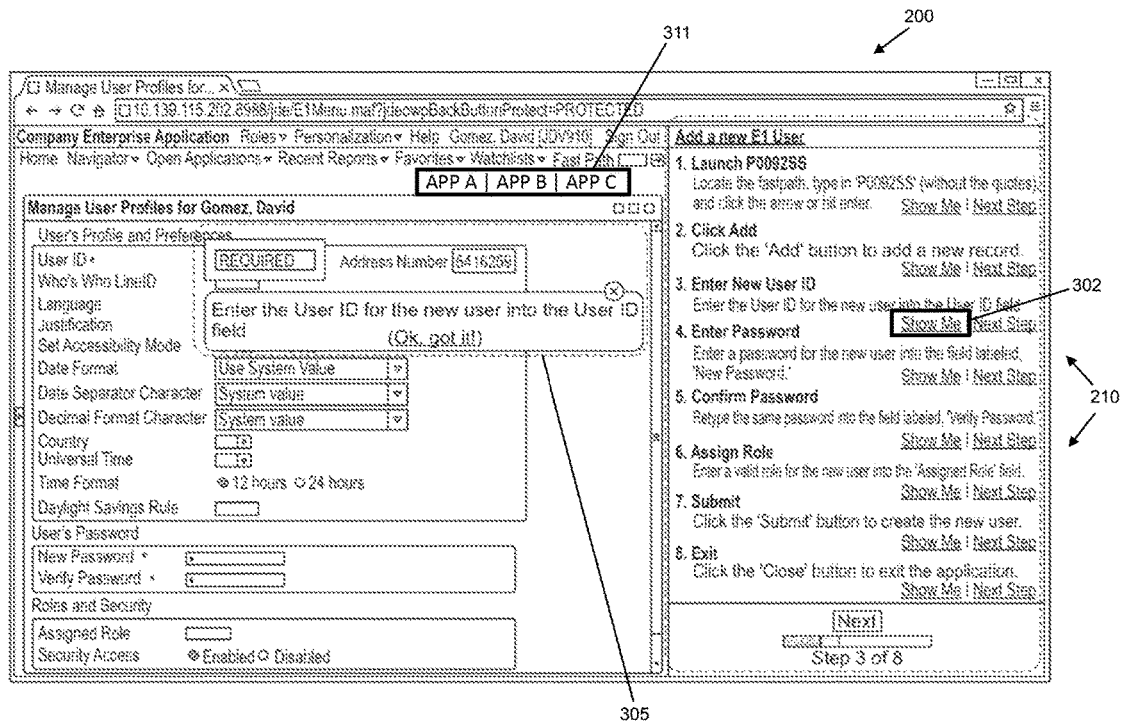
FIG. 3 illustrates an example screen display of an enterprise application with an area highlighted and further aspects of the action command engine.

Referring to FIG. 3, step 3 in the list of steps 210 directs a end-user to a New User ID, which is a field marked "REQUIRED" located at the top of the data entry area 205 (FIG. 2B). If the novice user is still confused about where and what to enter, he/she may click the "Show Me" button 302 which works as a type of step-specific coaching button. When clicked, a highlighting box 305 may pop up that shows the novice user which specific field to fill out, along with additional directions. The additional directions can be additional information that makes the step directions more human readable, and possibly to correct any human errors made when provided the recorded actions. Further, the additional information may include examples of what to enter so that the user may model their reply after the example entries. Once the novice user understands what to do, he/she may click "Ok, got it!" or a similar button that closes the coaching or highlighting functions of the step.

One significant advantage of the systems and methods disclosed here is that the task director may work across different applications within the application space 108 (FIG. 1). For example, in FIG. 3, application buttons 311 are illustrated that take the user to a new application when clicked. For instance, a user could be working on APP A 110 (FIG. 1) carrying out a task. A given step may direct the user to click on APP B button of the application button 311 (FIG. 3), which then takes the user to APP B 112 (FIG. 1), to complete the task. This ability to function both between apps and within apps sets the present solution apart from alternative process solutions, such as process flows or trainstop-like solutions that only guide the user smoothly when each of the conceptual pieces of a process fits nicely into an application that is launched independently as its own entry point. In the reality of existing processes in complex enterprise applications, this may not be the case, since the entry point is often a form exit, for example, and large conceptual chunks of the process will end up fitting into a single entry point.

Figure 4:
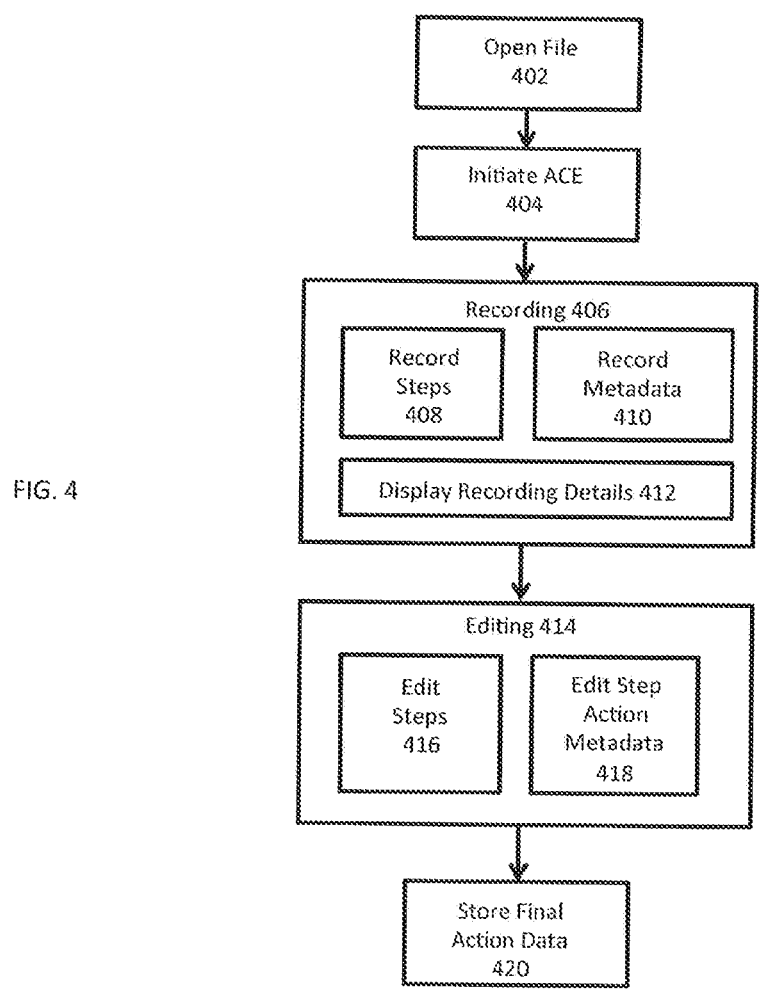
FIG. 4 shows an example method for creating a task-specific sequence object using the action command engine.
Figure 5:
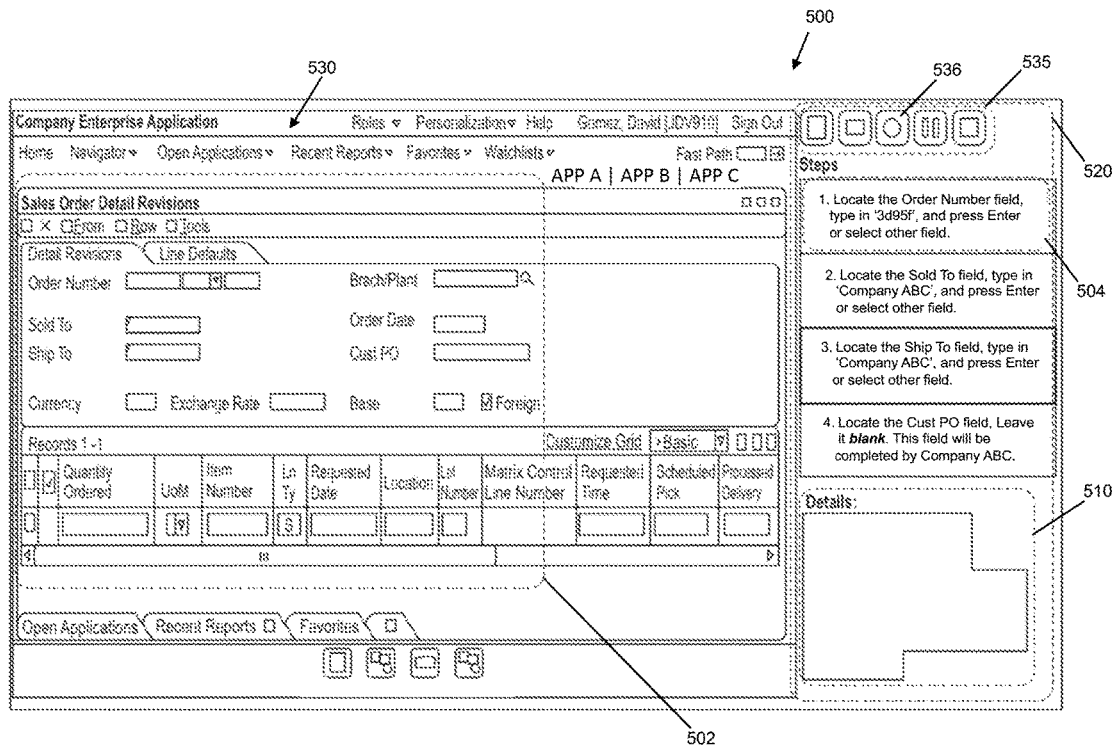
FIG. 5 illustrates an example screen display of an enterprise application and the recording aspects of the action command engine.

FIG. 4 shows an example process for creating a new task-specific sequence object. The example process here begins with opening the main application that the task-specific sequence object will use as a primary application at step 402. FIG. 5 illustrates the example primary application which as a main application 530. At step 404, the task director pane is initiated using available methods such as clicking a "Help" button in the main application (not shown), or launching a stand alone executable action command engine that can interact with the main application 530. FIG. 5 illustrates the task director pane 520 as opening alongside the main application 530.

One of ordinary skill in the art will appreciate that there are several ways to input steps to be completed into action command engine, such as entering steps through command scripts directly into the task pane; however here, a useful way for entering steps into a task-specific sequence object is by simply performing the action and recording how it is done. Thus at step 406, recording begins by clicking the record button 536 which may be within a set of control buttons 535 that augment the display controls such as start, stop, pause, save, etc. as illustrated in FIG. 5.

Various options may exist for implementation of the editor. For example, with respect to the recording phase, options may exist regarding the functions to capture interactions with the top-level interface, since this is somewhat challenging if there is not a pre-existing interaction event framework. Thus, in addition to recording the action, step, or event that the recording user completed 408, such as clicking a print button, the action command engine may also record additional metadata 410 necessary to understand how to complete the action, step or event, such as which object was manipulated on screen, which network paths were initiated, or what the user entered into a onscreen form. The metadata may include information that enables an interaction recorder framework, which uses API calls, GUI manipulator functions, or function calls into this framework for each interaction. Additional metadata may include completion criteria, such as triggers, timers, sufficient or necessary conditions, as explained below.

An alternative approach is to automatically iterate through the entire DOM (document object model), looking for interactive elements (e.g., links, elements with mouse events attached, form fields, etc.) and augment these elements with code to, in addition to performing the existing action, also record the interaction. This approach may be technically more demanding/difficult to implement, but may provide more complete coverage depending on project parameters.

Additional options may exist with respect to identifying objects. In general, it is not overly difficult to identify the object that was clicked. For recording purposes, it can be specified by the interaction logging code, identified by an event, or recognized by an event-listener analyzer. For manually-specified elements, one can implement a point-and-click mode similar to the select element functionality in most browser consoles. In the case where the identified object is too specific (e.g., just the text itself on a button when the entire button is wanted), the user can be given controls to walk up the tree and highlight the parent node instead. The user can also be given the option of specifying multiple objects—for instance, a text box and its label. The embodiment can allow the union to be highlighted visually in one of two modes: draw a box around each item, or draw the tightest bounding box that includes all of the items. Heuristics can also be used to predict which of these modes is preferable based upon the distance between the elements.

At 412, the action command engine may show the steps being recorded as a list of steps shown in the task director pane, as the user carries out the task. FIG. 5 shows an example user interface 500 of how the task director pane 520 may display the step recording process. There, as an example, if the first task is to enter an order number in the data entry field area 502, then the recording user may simply click on the "Order Number" entry field within 502 and enter the order number, at which point a first step 504 is automatically created with a data field. At this point, the recording user may edit the recorded step data 504 to include further details such as more accurate information, or metadata such as completion criteria. Optionally, the recording user can enter additional details for the task in a details entry area 510 which may include explanatory data for the task or steps, and may also include executable metadata items, such as completion criteria as explained below.

Each of the steps carried out by recording user is shown in FIG. 5 as a step within the task director pane; however the actual data corresponds to stored generated content 124 (FIG. 1) in a computer readable storage device 122, such as a database. In this way, user 102 can use the action command engine 116 and task director to access the generated content to guide the user across any number of applications which may exist in an application space 108 or external to the application space. The computer readable storage device 122 comprises any combination of hardware and software that allows for ready access to the data that is located at the computer readable storage device. For example, the computer readable storage device 122 could be implemented as computer memory operatively managed by an operating system. The computer readable storage device 122 could also be implemented as an electronic database system having storage on persistent and/or non-persistent storage.

Referring to FIG. 4, at the conclusion of the last step in the process, the recording user can stop recording. At this point, the user recording the action may, as an option, beginning editing what was recorded at step 414, such as editing step descriptions at step 416, removing, or adding at step, or editing metadata 418 associated with each step. Once the user is satisfied with the recording and metadata he/she may save it as a task-specific sequence object at step 420.

As mentioned above, the system and methods disclosed herein allow user 102 to use the action command engine as a guide to complete processes that span across two or more separate applications, such as APP A 110, and APP B 112, as shown in FIG. 1, but also allow the user 102 to use the action command engine as a guide through applications that have been intermittently updated by developers 114 or customized 115 by company clients for example.

Figure 6:
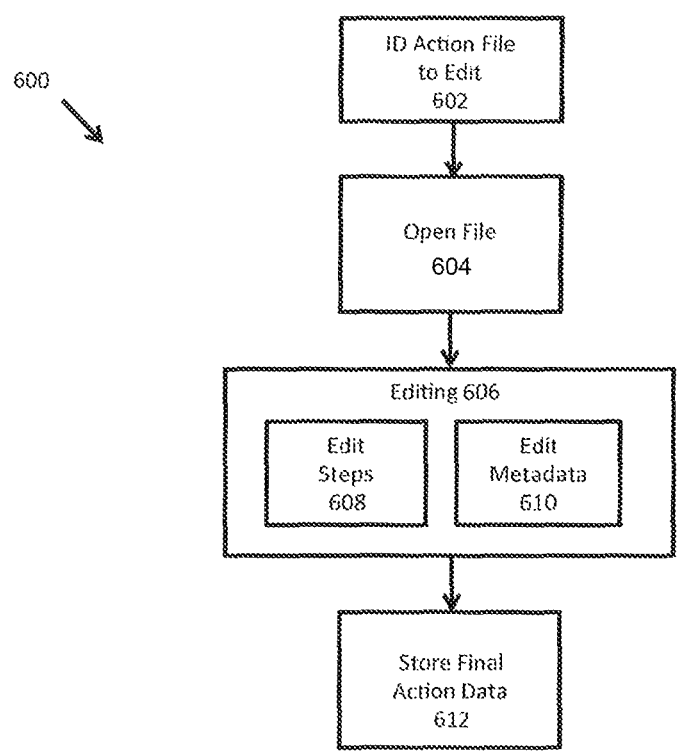
FIG. 6 shows an example method for customizing or editing existing task-specific sequence object.

FIG. 6 shows an example method 600 of how to use the action command engine to further customize task-specific sequence objects that have already been created. At step 602, the user identifies the task-specific sequence object or action file that the user wants to edit from a list of available task-specific sequence objects or, as an alternative, by navigating to where the task-specific sequence object is stored.

At 604, the user may open requisite files to edit the task-specific sequence object by opening the primary application(s) and action command engine, and then selecting the an edit button 240 (FIG. 2B). If the task-specific sequence object is stored as a package, the user may click on the package icon which can automatically execute the main application (or applications), along with the task-specific sequence object loaded into the task director pane all with one click.

At step 606, the user can edit the task-specific sequence object by editing the steps recorded 608, such by editing the details, ordering, or adding removing steps. Further the user may make edits to the metadata associated with the task, such as which programs to open or control, or make edits to the metadata associated with each step, such as to re-specifying which button to click in a certain step.

Figure 7:
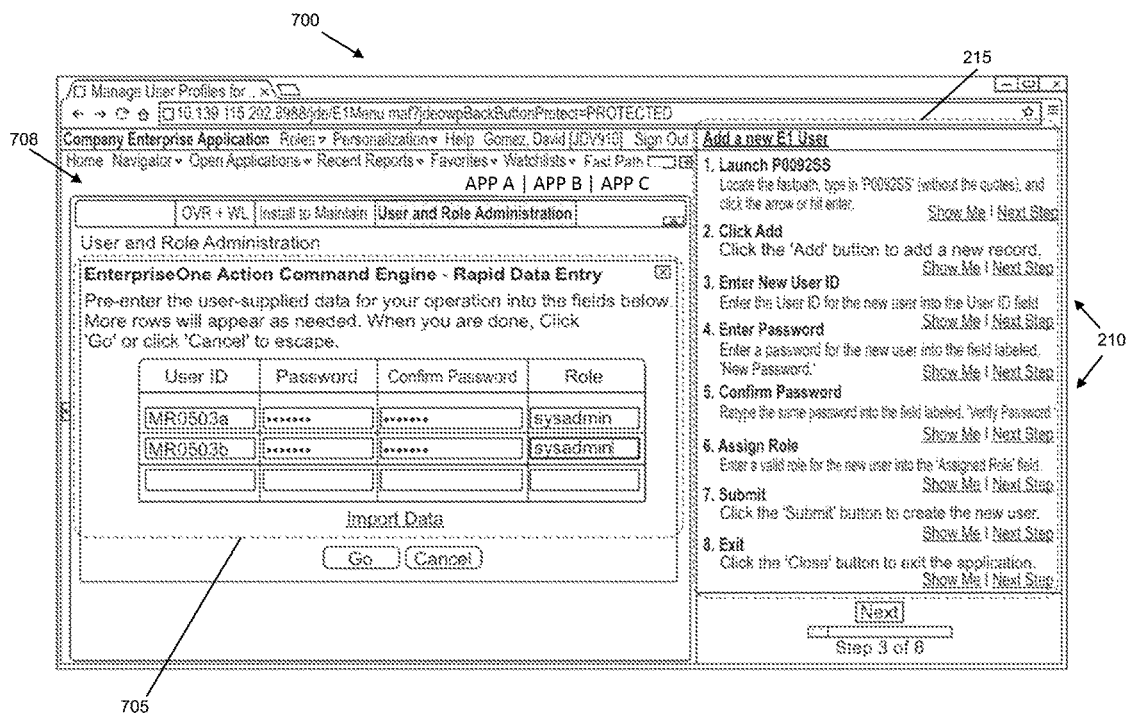
FIG. 7 illustrates an example screen display of the rapid entry aspects of the action command engine.

To further simplify a task-specific sequence object, a recording user may pre-enter auto-fill information into the action command engine in a batch mode, as shown in FIG. 7. There, the list of steps 210 is shown in the task pane director 215, and in the main application 708 is a batch entry or rapid data entry window 705. The batch entry or rapid data entry window 705 contains a number of fields and data that are prefilled by a recording user and may be saved as metadata that is integrated into the task specific sequence object.

The recording user may enter the fields into the rapid entry window 705 one by one, or may simply import the data, by clicking the import date of button, which allows the recording user to import data in a number of different forms, such as Microsoft Excel spreadsheets and comma separated values. As illustrated here, the recording user batch enters multiple User IDs, Passwords, Password Confirmations, and Roles. In this way, the later novice user executing the task-specific sequence object does not need to look up this information, some of which (such as the passwords), he/she may not have access to. In effect, the rapid data entry module allows a on-the-fly batch job or rapid data entry solution, built on top of and leveraging all the logic of the original application, rather than recreating it in a separate rapid data entry app.

As an example, when an end-user initiates the action command engine for a batch-filled task, he/she may first enter a user ID, such as "MR0503a" into an entry field (not shown). When the end-user inputs MR0503a, the action command engine may then auto-fill the password field, the password confirmation field, and the role field automatically using the information that was previously batch entered using the rapid entry window 705. One of ordinary skill in the art would appreciate that any combination of entries may trigger auto completions of other entries, as required per task and task-specific sequence object. In this way, simple tasks can be prefilled and handled by a recording user, and more complex tasks are handled by guiding a novice user through the complex tasks using the action command engine in the task pane window which executes the task-specific sequence object.

Various types of completion criteria can be defined for steps in a task-specific sequence object. For example, the completion criteria between step five and step six in a process would, in essence, define what it means to say that step five is complete and it is now safe/possible to perform step six. Completion criteria can either be an explicit action that triggers a completion flag, or can also measure a state of being that can be evaluated as true or false if one tries to continue to the next step in a process, or may also be a simple expiration of a timer, whereby the expiry of the timer signals that the next step may be processed.

For example, if the event is triggered, and the end of a step requires a user to click a button, the button may contain code that when executed triggers a flag to the action command engine that the step is complete and that the next step may be processed. Further types triggers include monitoring whether a required field has been filled out, monitoring whether a required field has been filled out with the correct type of data, e.g., that an email field contains an "@" symbol, or monitoring the movement of a cursor or mouse across the screen using scripting language, such as JavaScript, or other available methods.

A type of "state" completion criteria may be a necessary condition, which is a condition that if not met does not allow the process to continue. For instance, the existence of any on-screen elements for the following step could be viewed as an implicit necessary condition for the step boundary. For example, using a task wherein at step five a user creates a document using form fields and outputs a form called "Form A", and in step six the user prints "Form A" using a print button. The action command engine may determine whether step six should be available by examining the current page to detect the presence of the "Form A" object which step five should have outputted. If Form A is present on the current page, the action command engine may presume that step five is complete since the result of step five is to output Form A. Thus, Form A's presence on the current page is a necessary condition to continue to step six.

Another type of state completion criteria may be a sufficient condition wherein the system detects that if the conditions have been met, the system will automatically advance to the next step. In other words if the conditions are met then it proves to the system that the preceding step has been completed. The user can also automatically advance, even if the sufficient conditions have not been met, so long is no necessary conditions are violated.

For example, if a proceeding step required that the user navigate to a particular page, then clicking on a tile or button to go to that page would be the sufficient condition to conclude the step and allow the next step to process. However clicking the tile or button is not a necessary step, because if the user was already on the page he/she would not be able to click the tile or button to go that page (as it the tile/button would be on the previous page and not visible). Thus, using instead of using necessary condition, here a sufficient condition is appropriate.

A combination of the previous two conditions may also be a new type of completion state criteria, for example a necessary/sufficient condition. A necessary/sufficient condition corresponds to circumstances or items that are both necessary and sufficient to provide a complete definition for transition between two steps. If the conditions have been met, then there must be a transition to the next step. If they not been met, then there cannot be a transition to the next step. An example might be the conditional test for whether a particular page is active. If the page is active, then advance. If the page is not active, then do not advance. This is similar to the last example, but slightly different in that it is a state-of-being test, not a was-action-performed test.

Figure 8:
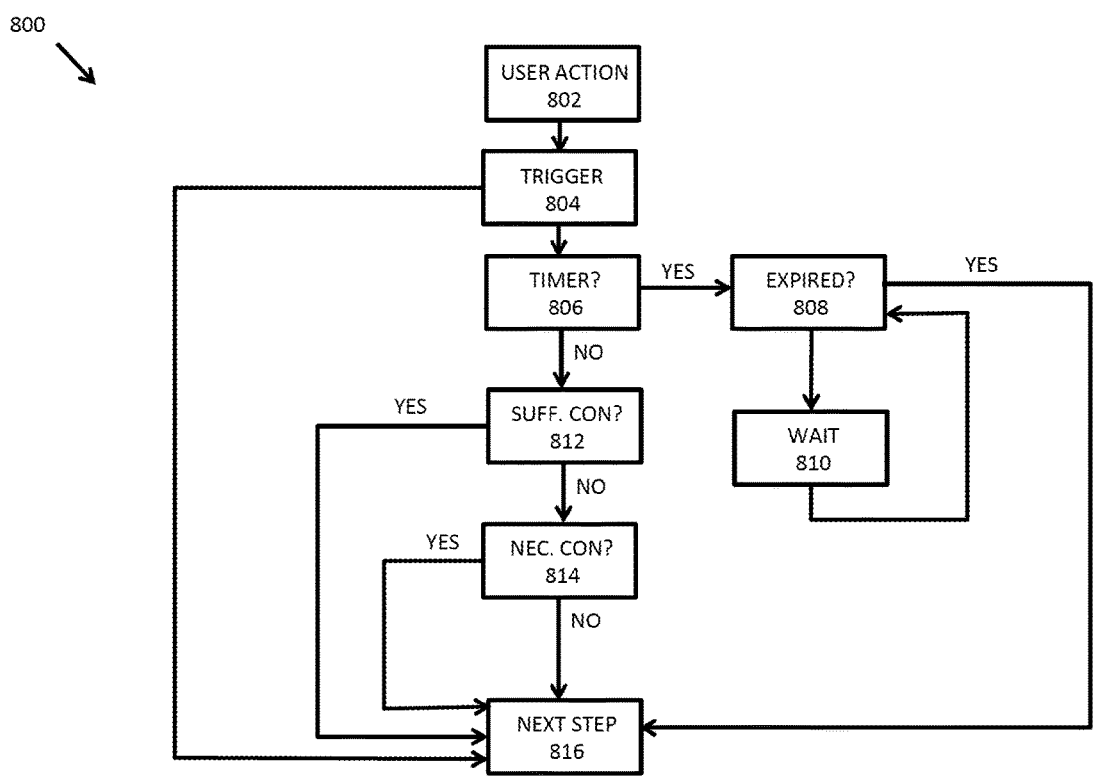
FIG. 8 shows an example method for determining whether completion criteria is met.

FIG. 8 shows method 800 for a variety of completion criteria that may be used to determine whether it is the next step is appropriate. At step 802 user action occurs, such as a user clicks on a button using the mouse, enters data into a form, or navigates to a certain page or area within a page. At 804, if the user action is linked to a direct trigger, then the process flags a trigger flag to signify that the current step is complete and that next step 812 is appropriate.

Assuming there is no direct trigger, a decision regarding the expiry of a timer is determined at step 806. There, if there is a timer then a determination is made on whether the timer is expired at 808. If the timer is expired, the next step is available at 812. If the timer is not expired, there may be a wait time, at 806, which the system waits before it checks whether the timer has expired or not again at 808. An additional example of a system using a timer, is a complex form where the system designers note that the average time to complete the form is five minutes, thus a timer is set to five minutes. The expiration of five minutes on the timer would act as a sufficient condition whereby if the timer expires the user may continue to the next step.

Assuming there is no timer implemented, the process continues to 812 to a determination of whether a sufficient condition has been met. If the sufficient condition has been met, then the process may continue to the next step at 816. If the sufficient condition has not been met, the process may continue to 814 where there is a determination on whether a necessary condition has been met. If the necessary condition has been met, then the process may continue to the next step at 816. The above process merely serves as an example of one combination of the embodiments and features. One of ordinary skill in the art will appreciate that different combinations may be implemented, such as not using a direct trigger or timer and only using necessary and/or sufficient conditions, only using a trigger, or only using a timer, or other combinations Some embodiments of the invention can be used to implement branching and/or looping within task-specific sequence objects. Steps could be arranged into essentially any directed graph to allow for decision points, joins, cycles, etc. This can be implemented by going into an advanced step ordering mode that depicts a process as a directed graph. In practice, many steps would have only one outbound edge, thus only one potential path, but special question steps would have multiple outbound edges, thus multiple potential paths. These branching/question steps would not have an associated object (other than the step itself) and would not contain any imperative statements. For example, instead of directing the user to "Do x," the step would ask a question. Each of the possible answers would be mapped to an edge leading to the next step. In this way, the action command engine can create highly dynamic task-specific sequence objects.

For example where the given process involves shipping "widget002" to "Company XYZ", only if "widget001" was previously shipped to "Company ABC". In this case, the task-specific sequence object's first step may be opening up an order database application and asking the user to check whether "widget001" was indeed shipped to Company ABC through guided steps and a pop up question window. The answer to the question creates a branch in the process. If the user selects "Yes", that "widget001" was shipped to Company ABC, then task-specific sequence object may prompt the user to close the current order database application and open a second shipping application and go through the steps of shipping the "widget002" to Company XYZ.

On the other hand, if the user selects "No", that "widget001" was not shipped to Company ABC, then the task-specific sequence object may instead prompt the user to close the current order database and open a second shipping application and go through the steps of shipping "widget001" to Company ABC, and only then go through the process of shipping "widget002" to Company XYZ. Alternatively, if it was very important that "widget001" be previously shipped to Company ABC, then when the user selects "No", that nothing was in fact sent to Company ABC, the task-specific sequence object may instead trigger an alert and may guide the user through the process of contacting the correct personnel, such as managers, to alert them that an important item was in fact not shipped. In this way, a complex highly dynamic enterprise process is reduced to a manageable workflow that dramatically increases efficiency while ensuring accuracy. One of ordinary skill in the art appreciates that the above processes are merely exemplary apply equally well to different combinations methods and systems.

Therefore, what has been disclosed is a novel approach for improving guiding users through complex tasks, such as processes involving enterprise software applications. The invention provides numerous advantages such as the ability to guide a user through a task across multiple applications in an end-to-end fashion, fine grain editing control over how the task-specific sequence object executes steps, and a batch entry mode that auto fills fields for users. An additional advantage includes the ability to quickly create custom task or process guides for software that has been updated by developers or customized for clients.

System Architecture Overview

FIG. 9 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method comprising:
recording a series of actions to complete a task as a series of steps, wherein a first step corresponds to an action taken on a first application and a second step corresponds to an action taken on a second application, wherein the first application is different than the second application;
saving the series of steps as a task-specific sequence object in a database, the task-specific sequence object comprising a task director configured to display the series of steps corresponding to actions to be taken by a user in a task director pane;
identifying, by the user, the task-specific sequence object corresponding to the series of actions; and
executing, by the user, the task-specific sequence object comprising the task director to visually help the user complete the task by simultaneously displaying, in a user interface, the task director configured to work across multiple different applications by displaying the series of steps corresponding to user actions for both the first application and the second application, wherein either the first application or the second application is displayed simultaneously along with the task director in the task director pane in correspondence with a step from among the series of steps corresponding to the user actions that are directed to a respective one of the first application or the second application.

2. The method of claim 1, wherein the task corresponds to an enterprise software application process.

3. The method of claim 1, wherein the series of steps comprise step data and step metadata.

4. The method of claim 1, wherein the task-specific sequence object includes completion criteria metadata.

5. The method of claim 4, wherein the completion criteria metadata include one of following: a trigger, a timer, a sufficient condition, or a necessary condition.

6. The method of claim 1, wherein the first application and the second application are accessed using one of the following: a function call, a GUI manipulator, or an API.

7. The method of claim 1, wherein the first application is an enterprise software application and the second application is not an enterprise software application.

8. The method of claim 1, wherein the series of steps saved in the task-specific sequence object include at least one of an interaction with a top-level user interface component, a component on a form, an element on a page, an external application, or a non-enterprise application.

9. The method of claim 1, wherein the task-specific sequence object is created as an executable file type.

10. The method of claim 1, where the task director pane includes a button that queues the next step.

11. The method of claim 10, wherein the task director pane includes a step specific coaching button.

12. A computer implemented method comprising:
creating, by a recording user, a task-specific sequence object by recording a series of actions to complete a task as a series of steps, wherein a first step corresponds to an action taken on a first application and a second step corresponds to an action taken on a second application, wherein the first application is different than the second application;
saving the task-specific sequence object in a database, the task-specific sequence object comprising a task director configured to display the series of steps corresponding to actions to be taken by a user in a task director pane, the task director configured to work across multiple different applications by displaying the series of steps corresponding to user actions for both the first application and the second application, wherein either the first application or the second application is displayed simultaneously along with the task director in the task director pane in correspondence with a step from among the series of steps corresponding to the user actions that are directed to a respective one of the first application or the second application and wherein the task-specific sequence object comprising the task director is executed by the user to visually help the user complete the task by simultaneously displaying, in a user interface, the task director; and
providing access, to the recording user, to edit the task-specific sequence object.

13. The method of claim 12, wherein the series of steps are recorded using a task director pane.

14. The method of claim 13, wherein the steps can be edited using the task director pane before the steps are saved as a task-specific sequence object in the database.

15. The method of claim 13, wherein the task-specific sequence object can be edited using the task director pane at a point in time after the task-specific sequence object is saved to the database.

16. The method of claim 12, further comprising:
recording a plurality of data items in a batch mode wherein the plurality of data items can be used to automatically complete steps when the task-specific sequence object is executed.

17. The method of claim 12, wherein the task director pane includes a control button set, including at least: record, play, and stop buttons.

18. The method of claim 17, wherein the task director pane includes access to edit metadata.

19. The method of claim 12, wherein the task corresponds to an enterprise software application process.

20. The method of claim 12, wherein the first application is an enterprise software application and the second application is not an enterprise software application.

21. A system, comprising:
a processor; and
a memory to hold a set of program code instructions, in which the set of program code instructions comprises program code to perform:
recording a series of actions to complete a task as a series of steps, wherein a first step corresponds to an action taken on a first application and a second step corresponds to an action taken on a second application, wherein the first application is different than the second application;
saving the series of steps as a task-specific sequence object in a database, the task-specific sequence object comprising a task director configured to display the series of steps corresponding to actions to be taken by a user in a task director pane;
identifying, by the user, the task-specific sequence object corresponding to the series of actions; and
executing, by the user, the task-specific sequence object comprising the task director to visually help the user complete the task by simultaneously displaying, in a user interface, the task director configured to work across multiple different applications by displaying the series of steps corresponding to user actions for both the first application and the second application, wherein either the first application or the second application is displayed simultaneously along with the task director in the task director pane in correspondence with a step from among the series of steps corresponding to the user actions that are directed to a respective one of the first application or the second application.

22. The system of claim 21, wherein the task corresponds to an enterprise software application process.

23. The system of claim 21, wherein the first application is an enterprise software application and the second application is not an enterprise software application.

24. The system of claim 21, wherein the series of steps saved in the task-specific sequence object include at least one of an interaction with a top-level user interface component, a component on a form, an element on a page, an external application, or a non-enterprise application.

25. A system, comprising:
a processor; and
a memory to hold a set of program code instructions, in which the set of program code instructions comprises program code to perform:
creating, by a recording user, a task-specific sequence object by recording a series of actions to complete a task as a series of steps, wherein a first step corresponds to an action taken on a first application and a second step corresponds to an action taken on a second application, wherein the first application is different than the second application;
saving the task-specific sequence object in a database, the task-specific sequence object comprising a task director configured to display the series of steps corresponding to actions to be taken by a user in a task director pane, the task director configured to work across multiple different applications by displaying the series of steps corresponding to user actions for both the first application and the second application, wherein either the first application or the second application is displayed simultaneously along with the task director in the task director pane in correspondence with a step from among the series of steps corresponding to the user actions that are directed to a respective one of the first application or the second application and wherein the task-specific sequence object comprising the task director is executed by the user to visually help the user complete the task by simultaneously displaying, in a user interface, the task director; and providing access, to the recording user, to edit the task-specific sequence object.

26. The system of claim 25, wherein the task corresponds to an enterprise software application process.

27. The system of claim 25, wherein the first application is an enterprise software application and the second application is not an enterprise software application.

28. The system of claim 25, wherein the series of steps saved in the task-specific sequence object include at least one of an interaction with a top-level user interface component, a component on a form, an element on a page, an external application, or a non-enterprise application.

29. A computer program product including a non-transitory computer readable medium having instructions which, when executed by a processor, causes the processor to perform a process, the process comprising:

recording a series of actions to complete a task as a series of steps, wherein a first step corresponds to an action taken on a first application and a second step corresponds to an action taken on a second application, wherein the first application is different than the second application;

saving the series of steps as a task-specific sequence object in a database, the task-specific sequence object comprising a task director configured to display the series of steps corresponding to actions to be taken by a user in a task director pane;

identifying, by the user, the task-specific sequence object corresponding to the series of actions; and executing, by the user, the task-specific sequence object comprising the task director to visually help the user complete the task by simultaneously displaying, in a user interface, the task director configured to work across multiple different applications by displaying the series of steps corresponding to user actions for both the first application and the second application, wherein either the first application or the second application is displayed simultaneously along with the task director in the task director pane in correspondence with a step from among the series of steps corresponding to the user actions that are directed to a respective one of the first application or the second application.

30. The computer program product of claim 29, wherein the task corresponds to an enterprise software application process.

31. The computer program product of claim 29, wherein the first application is an enterprise software application and the second application is not an enterprise software application.

32. The computer program product of claim 29, wherein the series of steps saved in the task-specific sequence object include at least one of an interaction with a top-level user interface component, a component on a form, an element on a page, an external application, or a non-enterprise application.

33. A computer program product including a non-transitory computer readable medium having instructions which, when executed by a processor, causes the processor to perform a process, the process comprising:

creating, by a recording user, a task-specific sequence object by recording a series of actions to complete a task as a series of steps, wherein a first step corresponds to an action taken on a first application and a second step corresponds to an action taken on a second application, wherein the first application is different than the second application;

saving the task-specific sequence object in a database, the task-specific sequence object comprising a task director configured to display the series of steps corresponding to actions to be taken by a user in a task director pane, the task director configured to work across multiple different applications by displaying the series of steps corresponding to user actions for both the first application and the second application, wherein either the first application or the second application is displayed simultaneously along with the task director in the task director pane in correspondence with a step from among the series of steps corresponding to the user actions that are directed to a respective one of the first application or the second application and wherein the task-specific sequence object comprising the task director is executed by the user to visually help the user complete the task by simultaneously displaying, in a user interface, the task director; and providing access, to the recording user, to edit the task-specific sequence object.

34. The computer program product of claim 33, wherein the task corresponds to an enterprise software application process.

35. The computer program product of claim 33, wherein the first application is an enterprise software application and the second application is not an enterprise software application.

36. The computer program product of claim 33, wherein the series of steps saved in the task-specific sequence object include at least one of an interaction with a top-level user interface component, a component on a form, an element on a page, an external application, or a non-enterprise application.

* * * * *

UNITED STATES PATENT AND TRADEMARK OFFICE
CERTIFICATE OF CORRECTION

| | | |
|---|---|---|
| PATENT NO. | : 9,798,525 B2 | Page 1 of 1 |
| APPLICATION NO. | : 14/491914 | |
| DATED | : October 24, 2017 | |
| INVENTOR(S) | : Rodgers et al. | |

It is certified that error appears in the above-identified patent and that said Letters Patent is hereby corrected as shown below:

In the Specification

In Column 2, Line 19, delete "FIG." and insert -- FIGS. --, therefor.

In Column 9, Line 56, before "not" insert -- have --.

In Column 10, Line 30, delete "combinations" and insert -- combinations. --, therefor.

In Column 12, Line 4, delete "PTSN," and insert -- PSTN, --, therefor.

Signed and Sealed this
Nineteenth Day of June, 2018

Andrei Iancu
*Director of the United States Patent and Trademark Office*